(12) United States Patent
Irwin

(10) Patent No.: US 6,368,242 B1
(45) Date of Patent: Apr. 9, 2002

(54) AXLE SHAFT RETAINER SYSTEM

(75) Inventor: Earl James Irwin, Fort Wayne, IN (US)

(73) Assignee: Spicer Technology, Inc., Ft. Wayne, IN (US)

( * ) Notice: Subject to any disclaimer, the term of this patent is extended or adjusted under 35 U.S.C. 154(b) by 0 days.

(21) Appl. No.: 09/628,504

(22) Filed: Jul. 28, 2000

(51) Int. Cl.[7] .................. F16B 21/18; F16H 48/08
(52) U.S. Cl. ............... 475/230; 403/359.5; 29/453
(58) Field of Search .................. 475/230; 403/326, 403/359.5, 319; 29/453

(56) References Cited

U.S. PATENT DOCUMENTS

| | | |
|---|---|---|
| 3,527,120 A | 9/1970 | Duer et al. |
| 3,651,713 A | 3/1972 | Mueller |
| 3,901,102 A * | 8/1975 | Manwaring ............... 475/246 |
| 4,722,244 A | 2/1988 | Tsuchiya et al. |
| 5,131,894 A * | 7/1992 | Hilker ..................... 475/230 |
| 5,545,102 A | 8/1996 | Burgman et al. |
| 5,584,777 A | 12/1996 | Sander et al. |
| 5,667,332 A | 9/1997 | Lindholm |
| 5,967,932 A | 10/1999 | Yee |
| 5,976,050 A | 11/1999 | Irwin |

* cited by examiner

Primary Examiner—Charles A Marmor
Assistant Examiner—Ankur Parekh
(74) Attorney, Agent, or Firm—Liniak, Berenato Longacre & White

(57) ABSTRACT

The drive axles of a motor vehicle differential assembly are secured within the central bores provided in the side gears of the differential assembly by a pair of arcuate retaining element having a rounded cross section which preferably is a piece of bar stock bent to define a 180° half-ring element that is securely held between an arcuate groove formed along the circumference of the axle and a rounded abutment surface provided on the side gear. The arcuate groove and rounded abutment surface reduce stress risers and eliminate the counterbore typically provided in the side gear. Moreover, the pair of retaining elements maximizes the frictional contact by circumscribing the axle by approximately 360°.

8 Claims, 5 Drawing Sheets

AXLE SHAFT RETAINER SYSTEM

BACKGROUND OF THE INVENTION

1. Field of the Invention

The present invention relates generally to motor vehicle differential assemblies and more particularly, to a new and novel means for retaining the ends of the drive axle shafts within a differential assembly. The invention is beneficial in instances where clearances between certain moving components of the assembly are very close.

2. Description of Related Art

Motor vehicle differential assemblies have been in common use for many years to allow one motor vehicle wheel on an axle to rotate at a different rate than the other motor vehicle wheel, such as would occur when a motor vehicle is turning, or two tires having different diameters are being used on the same axle.

A typical motor vehicle differential assembly includes a pair of meshing spider and side gears enclosed in a differential case. The case is usually a one-piece unit, having a ring gear bolted to the case. The case is usually made of cast iron. The spider gears, typically made of hardened steel, are held in place by a steel shaft, known as a pinion shaft, which passes through the differential case and the center of the spider gears. The spider gears, also commonly made of hardened steel, mesh with the side gears. When the ring gear and the differential case turn, the spider and side gears also turn. Power flow is through the case, into the spider gears, and on into the side gears. The side gears are splined to a pair of drive axles and transfer power to the drive axles, which in turn transfer power to wheels which drive the vehicle.

Known prior art means for keeping the drive axles firmly engaged within the side gears include C-locks which are received by a circumferential groove provided in the end of the drive axle and which project radially beyond the periphery of the drive axle to contact a nearby face of the side gear. The C-lock requires the arrangement of the spider gears and the side gears to provide a wide enough space between the side gear face and the pinion shaft to achieve adequate button thickness on the end of the drive axle where the groove for the C-lock is provided. Moreover, the C-lock design provides far less than 360° frictional contact around the circumference of the axle shaft, thus fails to provide maximum frictional contact about the circumference of the axle shaft due to the open end of the c-shaped ring. Where the spider gear and side gear arrangement does not yield enough space to realize appropriate button thickness, alternate means of retaining the drive axles are required.

Another known retention means makes use of a cam plug and a set of balls mounted within an axially disposed recess at the end of the drive axle. Rotation of the pinion gear shaft moves the cam plugs further into the recess and the balls outwardly into locking engagement with an annular recess within the side gears. The pinion shaft is then secured against rotation by a pin or screw which extends therethrough.

The present invention achieves the same or better results as the above described known retention means using the C-lock, cam plug and balls; but, with both a greatly simplified design and a stronger link between the side gears and the drive shafts.

SUMMARY OF THE INVENTION

It is therefore an advantage of the present invention to provide a new and improved means for retention of a drive axle within a motor vehicle differential assembly that reduces or eliminates the stress risers created in the conventional design and reduces or eliminates the counterbore required for the side gears of the convention design.

These advantages are provided by a system and method for securing drive axles of a motor vehicle differential assembly within the central bores in the side gears of the differential assembly with a pair of arcuate retaining elements having a rounded cross section. These elements preferably are formed from a piece of bar stock bent to define a 180° half-ring element. The pair of retaining elements is securely held between an arcuate groove formed along the circumference of the axle and a rounded abutment surface provided on the side gear. The arcuate groove and rounded abutment surface reduce stress risers and eliminate the counterbore typically provided in the side gear. Moreover, the pair of retaining elements maximizes the frictional contact by circumscribing the axle by approximately 360°.

These advantages and other novel features of the present invention will become apparent in the following detailed description of the invention when considered in conjunction with the accompanying drawings.

BRIEF DESCRIPTION OF THE DRAWINGS

A better understanding of the present invention will be had when reference is made the accompanying drawings, wherein identical parts are identified by identical reference numerals and wherein.

DETAILED DESCRIPTION OF THE PRESENT INVENTION

Figure 1:
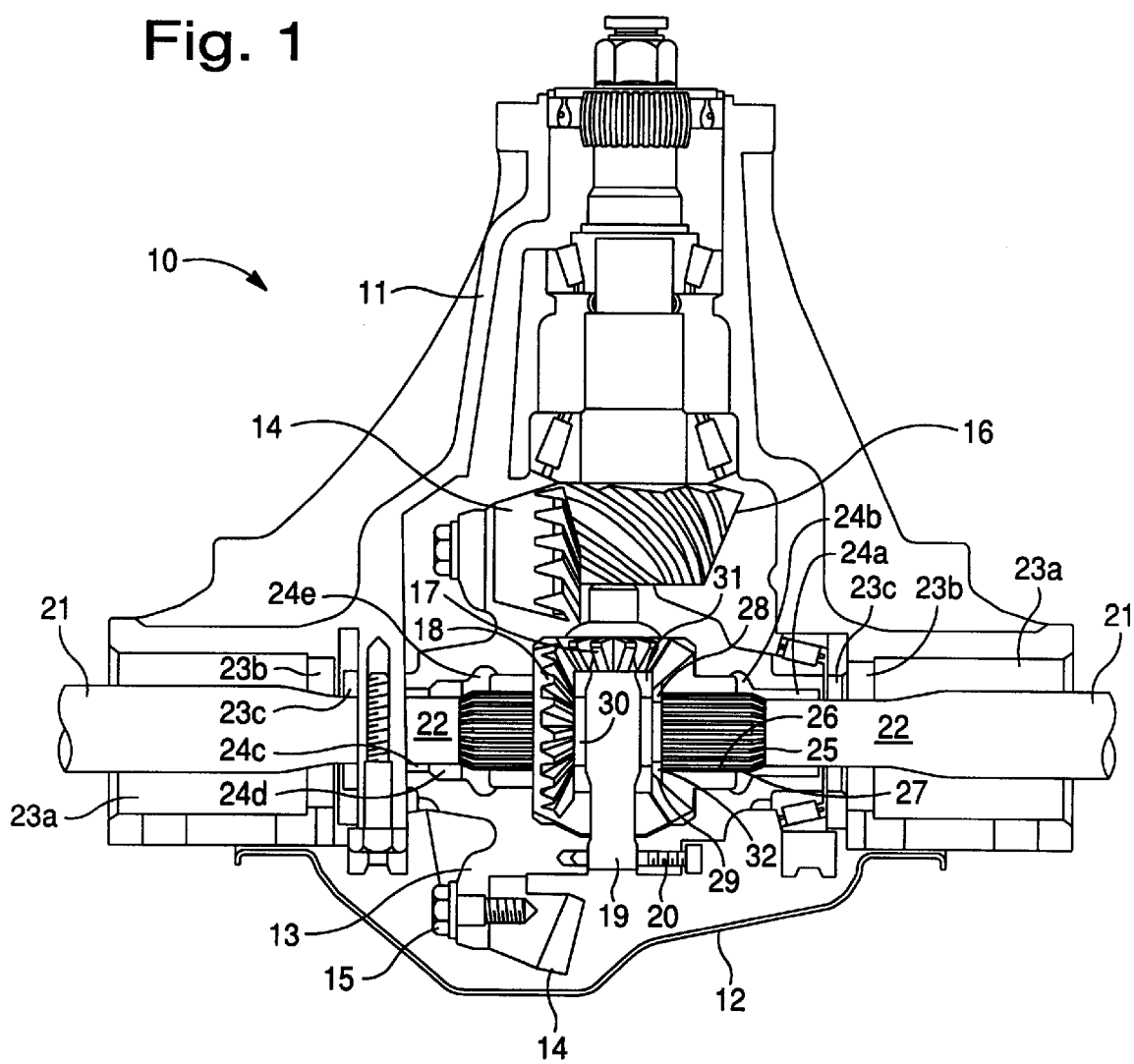
FIG. 1 is a top sectional view of a typical motor vehicle differential assembly employing a well-known means for retaining drive axles.

FIG. 1 provides a top sectional view of a conventional motor vehicle differential assembly designated generally by the reference numeral 10. A review of FIG. 1 will show that the assembly 10 is comprised of a differential carrier 11 and a differential cover 12, within which is situated a differential case 13. The differential case 13 contains a ring gear 14 that is bolted to the differential case 13 by a ring gear bolt 15. Also situated within the differential case 13 is: a drive pinion gear 16 which mechanically meshes with the ring gear 14;

a pair of spider gears 17; a pair of side gears 18 that mesh with the pair of spider gears 17; a pinion shaft 19 that connects the pair of spider gears 17; a threaded lock screw 20 that is received by bores in the differential case 13 and by a bore in the pinion shaft 19 in such manner as to secure the shaft 19 from axial and rotational movement; a pair of drive axles 21, each of which have end portions 22 that are received by a series of axially connected, generally cylindrical passageways 23a, 23b and 23c provided in the differential carrier 11 and passageways 24a, 24b, 24c, 24d, and 24e in the differential case 13. The end portions 22 of the drive axles 21 are provided with a plurality of radially projecting splines 25 that engage a corresponding plurality of splines 26 which is provided about the periphery of a central bore 27 in each of the side gears 18.

FIG. 1 further shows that at the innermost ends of the splines 25 on each of the end portions 22 of the drive axles 21 there is provided a square circumferential groove 28 and that at the innermost ends of the splines 26 provided in the bore 27 of each of the side gears 18 there is provided a shallow counterbore 29. Each of the circumferential grooves 28 serve to define a button-like end 30 on each of the drive axles 21. The button-like ends 30 project inwardly beyond the inner hub portion of each of the side gears 18 and either make contact, or come very near to making contact, with the pinion shaft 19. By so extending, the button-like ends 30 define a pair of annular spaces 31. In order that the end portions 22 of the drive axles 21 will remain engaged in the bores 27 of the side gears 18, a ring-like drive axle C-lock 32 is provided in each of the circumferential grooves 28. Dimensionally, the C-lock 32 has an outside diameter and a thickness that substantially match the diameter and depth of the counterbore 29 provided in the bore 27. By engaging the circumferential grooves 28 and the base of the counterbores 29, the C-locks 32 act to resist axial movement of the end portions 22 and to thereby retain the drive axles 21 in the bores 27 so that they will receive driving torque.

Usage of the C-locks 32 to retain the drive axles 21 has been known to work adequately where the arrangement of the spider gears 17 and the side gears 18 causes each of the annular spaces 31 to be wide enough to allow for the button-like ends 30 to have a thickness which will be adequate to resist shearing forces tending to expel the drive axles 21 from the differential assembly 10. However, the C-locks 32 fail to maximize the circumferential frictional contact between the axle shaft and the side gear because the C-locks 32 require an open end for insertion onto the circumferential grooves 28. Where the need to achieve certain vehicle performance requirements causes the annular spaces 31 to become so thin that adequate thickness of the button-like ends 30 cannot be provided, alternative means for retaining the drive axles 21 are necessary.

Figure 2:
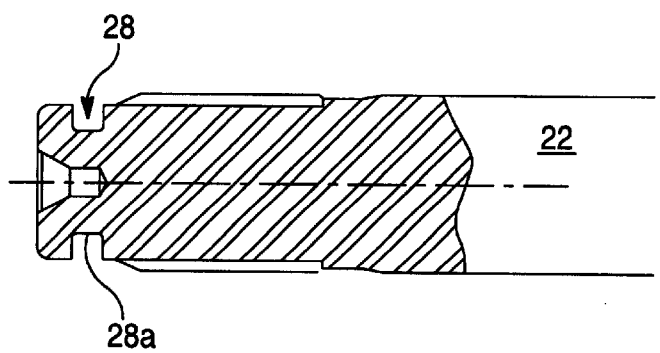
FIG. 2 is a sectional view of an axle shaft designed according to the conventional retaining system of FIG. 1.

FIG. 2 is a sectional view of the axle 22 designed according to the C-lock conventional design shown in FIG. 1. The C-ring design requires a circumferential groove 28 formed with small radii portions 28a, and the manufacturing process for such small radii portions requires both a turning operation and a grinding operation. These operations result in a short tool life due to these small radii portions. Moreover, the small radii portions result in stress risers at the corners 28a.

Figure 3A:
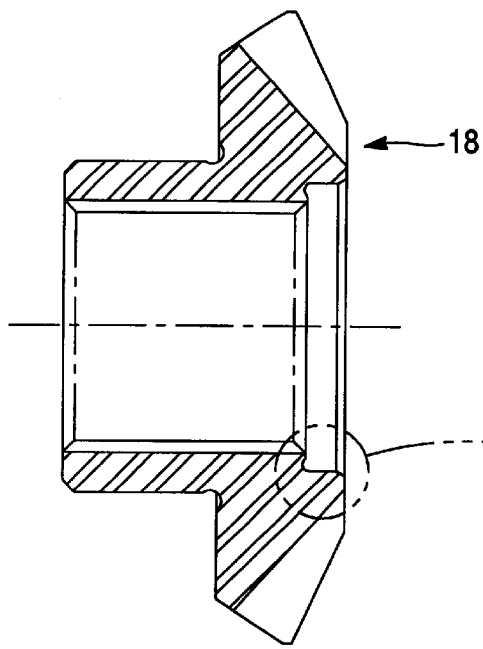
FIG. 3 is a sectional view of a side gear designed according to the conventional retaining system of FIG. 1.
Figure 3B:
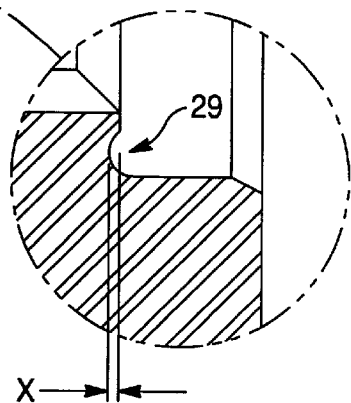

FIG. 3 is a sectional view of a side gear 18 shown in FIG. 1. According to the conventional C-lock design, each side gear 18 must be manufactured with a shallow counterbore 29 (with a depth 'x') with a relative small radius in order to provide a suitable abutment surface for the c-ring element 32. As with the circumferential groove 28 of the axle, the small radius of the counterbore 29 shortens the tool life of the manufacturing equipment.

Figure 4A:
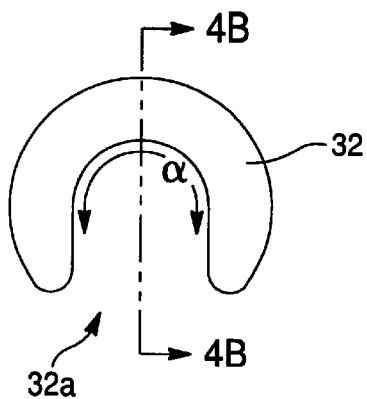
FIG. 4 is a sectional view of a c-ring designed according to the conventional retaining system of FIG. 1.
Figure 4B:

FIGS. 4a and 4b are sectional view of the c-ring element 32 of the conventional C-lock design. As clearly shown in FIG. 4a, the c-ring element 32 has an open end 32a to enable assembly of the C-lock retaining system. The c-ring element 32 shown in FIG. 4a provides a maximum frictional contact angle of no more than 220° (see angle α) with the opening 32a provided to enable the c-ring 32 to fit within the circumferential groove 28 of the axle shaft.

Figure 5:
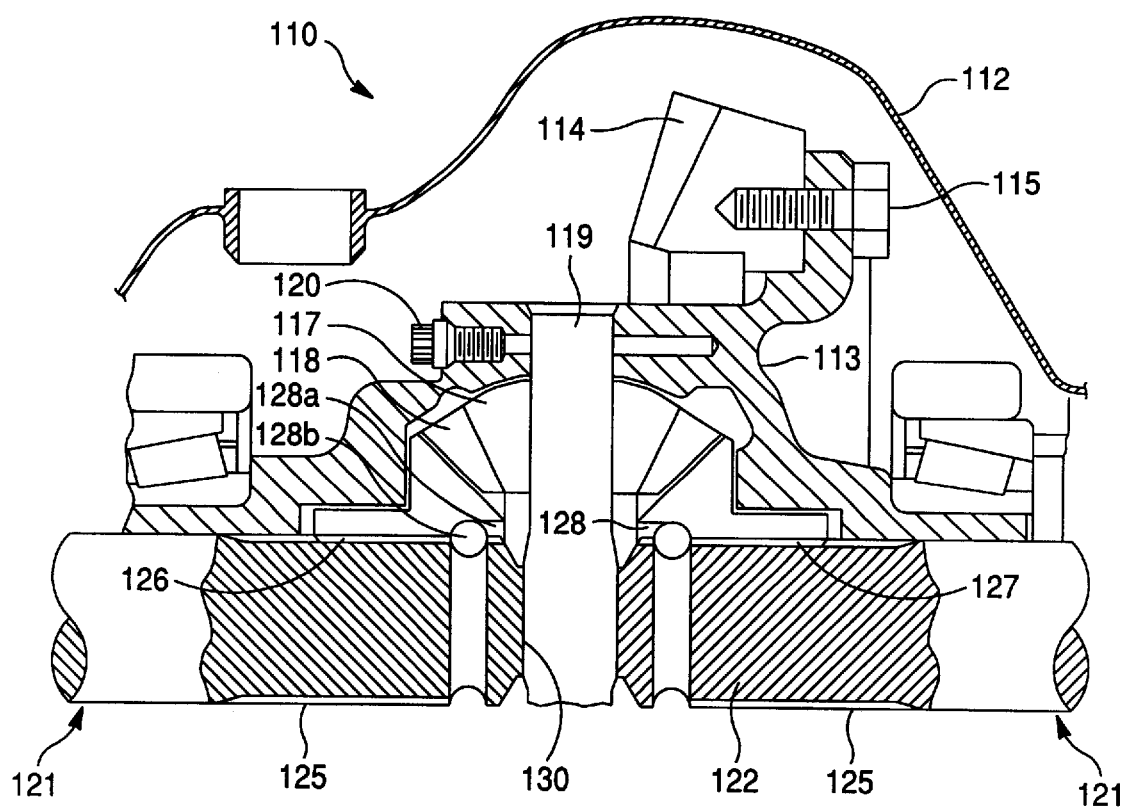
FIG. 5 is a partial top sectional view of a motor vehicle differential assembly of the present invention.

FIG. 5 provides a partial top sectional view of a vehicle differential assembly 110 of the present invention. Like the conventional differential assembly 10, the assembly 110 of the present invention is comprised of: a differential cover 112; a differential case 113 situated within the cover 112; a ring gear 114; a ring gear bolt 115 that fastens the ring gear to the differential case 113; a pair of spider gears 117 (only one of the gears is shown in FIG. 5); a pair of side gears 118 that mesh with the spider gears 117; a pinion shaft 119 that connects the spider gears 117; a lock screw 120 received by bores in the differential case 113 and a bore in the pinion shaft 119 to secure the shaft 119 from axial and rotational motion; and a pair of drive axles 121. Each of the drive axles 121 has an end portion 122 which is provided with a plurality of radially projecting splines 125 that engage a corresponding plurality of splines 126 provided about the inside surface of a central bore 127 extending through each of the side gears 118.

Figure 6:
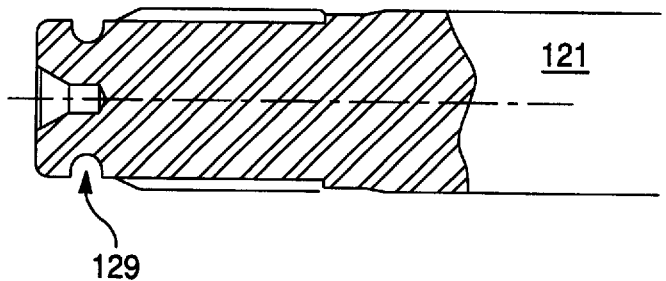
FIG. 6 is a sectional view of an axle shaft designed according to the retaining system of FIG. 5 showing the present invention.
Figure 7A:
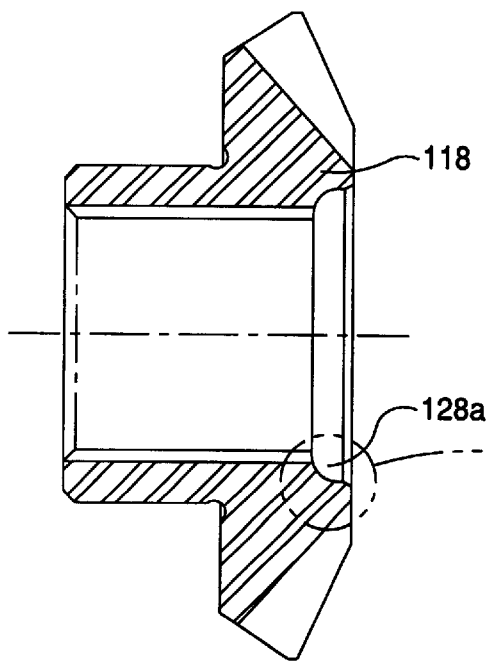
FIG. 7 is a sectional view of a side gear designed according to the retaining system of FIG. 5 showing the present invention.
Figure 7B:
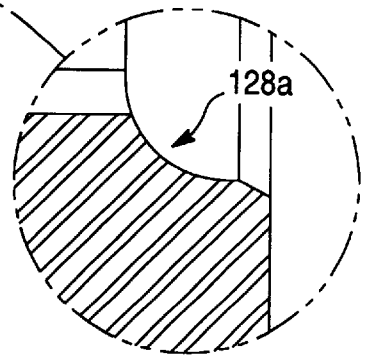

With reference to FIG. 5 and to FIGS. 6 and 7 which provide cross sectional views of the axle 121 and the side gear 118 respectively, it will be noted that each of the side gears 118 is provided with an elongated cavity 128 in the end of central bore 127 that is closest to the pinion shaft 119. The cavity 128, when viewed in cross section (FIG. 7), has a semi-circular wall portion 128a. The axle 121 is provided with a correspondingly semi-circular groove 129 extending around the circumference of the axle 121. Disposed in the semi-circular groove 129 and abutting the semi-circular wall surface 128a are a pair of circular-like arcuate members 132a, 132b.

FIG. 6 is a sectional view of the axle 121 and semi-circular groove 129. It is noted that the groove 129 does not include the stress risers present in the conventional design illustrated in FIG. 2 and the axle 121 has a button end portion that is much stronger that the conventional design. Significantly, the tool life of the tool(s) required to machine the groove 129 is increased on the average from about three to five times the tool life of tool(s) used to manufacture the small radius grooves present in the conventional design (see FIG. 2) because the large radius portion defining the groove 129 causes less wear on the machine tool.

FIG. 7 is a sectional view of the side gear 118 showing the semi-circular wall surface 128a and also showing that the side gear 118 of this invention does not require the counterbore of the conventional design (see FIG. 3). Once again, the tool life of the tool(s) required to machine the semi-circular wall surface 128a is increased on the average from about three to five times the tool life of tool(s) used to manufacture the counterbore 29 of FIG. 3 with small radius portions present in the conventional design (see FIG. 3) because the large radius portion defining the wall surface 128a causes less wear on the machine tool.

Figure 8A:
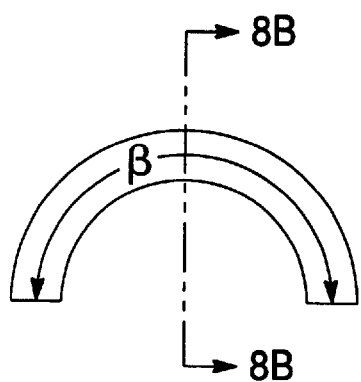
FIG. 8 is a sectional view of a c-ring designed according to the retaining system of FIG. 5 showing the present invention.
Figure 8B:

FIGS. 8a and 8b are sectional view of the circular-like arcuate element 132a, 132b. As clearly shown in FIG. 8a, the arcuate elements 132a, 132b define an angle β of about 180°. This invention envisions a retaining system having a total frictional contact angle of about 360° because two of the arcuate elements 132a, 132b shown in FIG. 8a will compete encircle the axle shaft 121 along the groove 129.

It is also noted that while FIG. 8b shows a circular cross section for the retaining element, the present invention works equally well when the cross section of the element 132a, 132b is slightly oval (see dotted lines in FIG. 8b).

Figure 9:
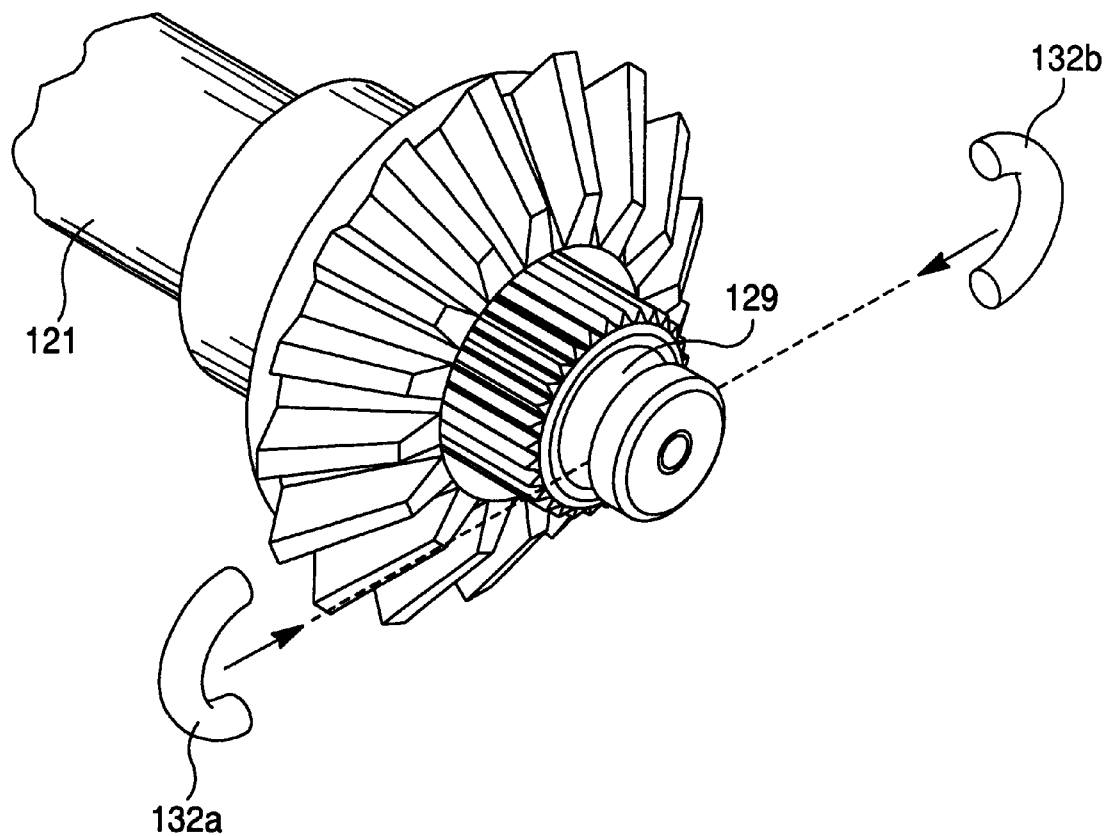
FIG. 9 is a schematic view showing the assembly process associated with the retaining system of the present invention as it pertains to the axle and side gear.

FIG. 9 is a schematic view exemplifying the assembly process associated with this invention, whereby the axle 121 with associated groove 129 is inserted into and partially through the side gear 118. Thereafter, the retaining elements 132a, 132b are both disposed within the groove 129 to substantially circumscribe the axle 121 within the groove 129. The axle 121 is then retracted until the retaining elements 132a, 132b abut the semi-circular wall portion 128a formed on the inside of the side gear 118, thereby providing a locking interface between the axle shaft 121 and the side gear 118.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A motor vehicle differential assembly comprised of:
   an outer differential carrier;
   a differential cover affixed to said outer differential carrier;
   a differential case enclosed by said outer differential carrier and said differential cover;
   a ring gear situated proximate to an interior wall of said differential case and secured to said wall by a fastening means;
   a pinion gear also located in said differential case and oriented at a right angle to said ring gear and mechanically engaging the teeth of said ring gear;
   a pinion shaft situated in said differential case such that one of its ends is proximate to said pinion gear and the other of its ends is directed towards said differential cover;
   a pair of differential pinion gears positioned in parallel fashion on opposing end regions of said pinion shaft by means of a central bore provided through each of said differential pinion gears and oriented such that the teeth bearing surfaces of said pinion gears are faced toward the central region of said pinion shaft;
   a pair of side gears positioned parallel to one another and perpendicularly to said pair of pinion gears, and further positioned so that the teeth bearing surfaces of said side gears are faced toward one another and are mechanically engaged with said pair of pinion gears at diametrically opposed portions of the teeth bearing surfaces of said side gears;
   a pair of drive axles received by said differential carrier and said differential case and having end portions provided with a plurality of radially projecting splines and an arcuate groove extending about a circumference of each of said drive axles, said end portions being received by a central bore provided through each of said side gears, said central bore having a plurality of splines provided about its inside surface, which are engaged by said plurality of radially extending splines provided on said end portion, and said central bore further having a rounded abutment surface situated in the end of said central bore that is closest to said pinion shaft and communicating with said arcuate groove in said end portions of said pair of drive axles; and
   a pair of retaining elements disposed within said arcuate groove and contacting said rounded abutment surface.

2. A motor vehicle differential assembly as claimed in claim 1, wherein said rounded abutment surface provides a continuous surface extending from said inside surface of said central bore to a increased diameter portion of said central bore thus eliminating a need for a counterbore portion formed in said side gears.

3. A motor vehicle differential assembly as claimed in claim 1, wherein said retaining elements are shaped to conform to said rounded abutment surface and said groove.

4. A motor vehicle differential assembly as claimed in claim 1, wherein said retaining elements are circular in shape to conform to said rounded abutment surface and said groove.

5. A motor vehicle differential assembly as claimed in claim 1, wherein said retaining elements are oval in shape to conform to said rounded abutment surface and said groove.

6. A motor vehicle differential assembly as claimed in claim 3, wherein said retaining elements together circumscribe said axle shaft by substantially 360°.

7. A method for securing a pair of drive axles in a motor vehicle differential assembly, the method comprising the steps of:
   removing a pinion shaft from the central bore of each of a pair of pinion gears positioned in parallel fashion on opposing ends of said pinion shaft and located within a differential case;
   making accessible an arcuate groove provided on the end portion of each of said drive axles by alternately sliding said end portions of said drive axles into a void space created by removing said pinion shaft and from a central bore provided in each of a pair of side gears which are positioned parallel to one another and perpendicularly to said pinion gears;
   depositing a pair of retaining elements in said arcuate groove;
   retracting said end portion from said void space and into said central bore so that said retaining elements abuts a rounded abutment surface provided in said central bore; and
   reinstating said pinion shaft to its original position in the central bore of each of said pair of pinion gears.

8. The method of claim 7, wherein said step of depositing includes circumscribing said drive axles with said pair of retaining elements to maximize a frictional interlock arrangement between said drive axle, said retaining elements and said side gears.

* * * * *